United States Patent [19]
Janssen et al.

[11] 3,973,808
[45] Aug. 10, 1976

[54] ICE STUD FOR SNOWMOBILE TRACKS

[75] Inventors: Roger G. Janssen, Crookston; Wayne G. Schantzen, Thief River Falls, both of Minn.

[73] Assignee: James R. Musselman, Hope, Mich.

[22] Filed: Dec. 12, 1974

[21] Appl. No.: 532,301

[52] U.S. Cl. .................................. 305/54; 180/5 R
[51] Int. Cl.² ....................................... B62D 55/24
[58] Field of Search ............ 305/54, 35 EB, 51, 10; 180/5 R

[56] References Cited
UNITED STATES PATENTS
3,865,441   2/1975   Jolliffe ................................. 305/54

FOREIGN PATENTS OR APPLICATIONS
881,198   1/1943   France .................................. 305/51

*Primary Examiner*—Philip Goodman
*Attorney, Agent, or Firm*—John J. Swartz

[57] ABSTRACT

A one-piece stud and method of making a stud for a snowmobile track comprising a hub mounting a plurality of perimetrically spaced, radially outwardly flaring, ground engaging teeth. The stud is made in a series of steps including bending a portion of a star-shaped blank out of the plane of the blank to form curvilinear teeth and then bending part of the previously bent portion in an opposite direction to form a mounting hub.

36 Claims, 21 Drawing Figures

ICE STUD FOR SNOWMOBILE TRACKS

BACKGROUND OF THE INVENTION

This invention relates to a ground engaging stud for an endless snowmobile drive track and more particularly to a stud and method of making a stud which has radially, outwardly flaring, curvilinear teeth mounted on a central mounting hub.

Snowmobiles are propelled by endless, ground engaging drive belts. Ice gripping studs have been mounted on the outer surface of the belt to enhance traction, particularly during snowmobile races such as the 500 mile snowmobile race conducted annually in Sault Ste. Marie, Mich. To maximize surface ice penetration, it is important that the stud include ice penetrating teeth which will penetrate hard ice on which the snowmobile travels. A stud constructed according to the present invention is provided with a plurality of individual, elongate teeth circumferentially disposed about a longitudinal stud axis which is generally perpendicular to the snowmobile drive belt, and the surface being traversed.

The traction capabilities of the stud is greatly enhanced if the teeth flare radially outwardly. With a stud constructed according to the present invention, the teeth, as they wear, will be self-sharpening in a manner to be more particularly described hereinafter. A stud is disclosed in U.S. Pat. No. 3,572,851, granted Mar. 30, 1971 having ground engaging teeth which are generally perpendicular to a snowmobile drive belt. As this prior art stud negotiates the front drive roll of a snowmobile and the teeth initially engage the surface, the teeth are inclined rearwardly relative to the direction of belt travel and sometimes do not "dig in" but rather skip and jump over the surface. It has been found that, if the teeth are so flared that the attitude of the lead tooth of a given stud is generally vertical to the surface being traversed as the tooth negotiates the front drive sprocket of a snowmobile and initially engages the surface, the lead tooth will better penetrate the ice whereby traction is increased. Accordingly, it is the object of the present invention to provide a traction increasing stud for a snowmobile track including a plurality of perimetrically disposed, radially outwardly flaring, ground engaging teeth.

It is another object of the present invention to provide a snowmobile belt in combination with a stud having a lead tooth which is flared radially outwardly relative to the stud axis and mounted so as to be disposed generally vertical to the surface being traversed as the tooth engages the surface.

To strengthen the load bearing capabilities of the stud constructed according to the present invention, the individual teeth are bent into a circumferentially curvilinear, concavoconvex shape by bending a portion of a star shaped blank in a first direction out of the plane of the blank. The load bearing capabilities are further enhanced by bending a part of the previous bent blank portion in an opposite direction to provide a mounting hub having an annular rim which is generally vertical to the snowmobile belt and parallel to the stud axis. Accordingly, it is another object of the present invention to provide a stud for a snowmobile track including a plurality of radially outwardly flaring ice penetrating teeth mounted on a hollow, cylindrical hub wall which is adapted to be disposed generally perpendicular to the snowmobile drive belt.

It is a further object of the present invention to provide a one-piece stud of the type described including a plurality of radially outwardly flaring ground engaging teeth which are circumferentially curved to define concavo-convex teeth.

It is another object of the present invention to provide a one-piece stud of the type described having a plurality of ice penetrating teeth which flare outwardly in such a manner as to be self-sharpening as they wear.

It is another object of the present invention to provide a stud which will minimize the accumulation of ice within the stud.

It is another object of the present invention to provide a stud of the type described including an even number of individual, ground engaging teeth.

It is another object of the present invention to provide a method of making a stud including bending a portion of the blank to form arcuate ice penetrating teeth and then bending a part of the bent portion in an opposite direction to form a cylindrical hub.

Other objects and advantages of the present invention will become apparent to those of ordinary skill and art as the description thereof proceeds.

SUMMARY OF THE INVENTION

A stud for a snowmobile track including a plurality of radially outwardly flaring ground penetrating teeth which are perimetrically curvilinear. The stud is made by bending a portion of a blank to form curvilinear teeth and then bending a portion of the blank radially inwardly of the teeth in an opposite direction to form a mounting hub.

The invention will be more particularly described by reference to the following drawings of which.

DESCRIPTION OF THE PREFERRED EMBODIMENT

A snowmobile drive track constructed according to the present invention is generally designated 10 (FIG. 6) and includes an endless drive belt 12 trained around a pair of end rolls 14. At least one of the end rolls is driven via a power train (not shown) to drive the belt 12 in an endless path of travel, represented by the arrow 16.

Figure 6:
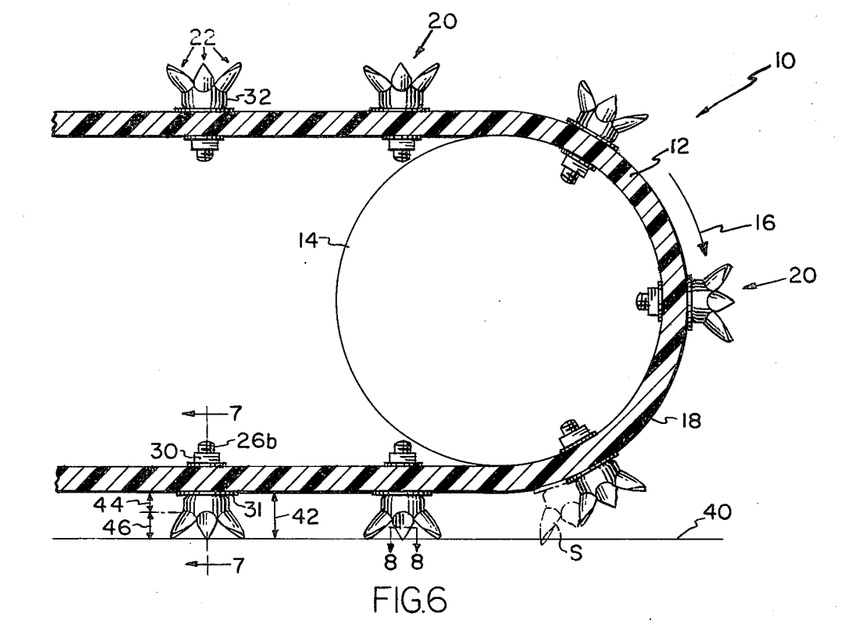
FIG. 6 is a fragmentary, vertical sectional view illustrating an endless snowmobile drive belt mounting studs constructed according to the present invention.

Mounted on the outer surface 18 of the belt 12 is a plurality of ice penetrating studs, generally designated 20, constructed according to the present invention. Each stud 20 includes a central hub, generally designated 21, and a plurality of radially, outwardly flaring teeth 22 projecting therefrom. The hub 21 is cup-shaped and includes a generally planer circular base 24 having an aperture 25 therein receiving the stem 26a of a mounting bolt 26. The bolt stem 26a is threaded at 27 and passes through an aperture 28 provided in the belt 12. The bolt 26 is secured to the belt 12 via a nut 30.

An enlarged stabilizing washer 31 is disposed on the mounting bolt 26 between the planer stud base 24 and the outer surface 18 of the drivebelt 12 to stabilize the stud and prevent it from "pulling through" the belt 18. If desired, the studs 20 may also be mounted within a U-shaped channel 27, illustrated in FIGS. 17 and 19, extending the width of the belt 12.

Figure 5:
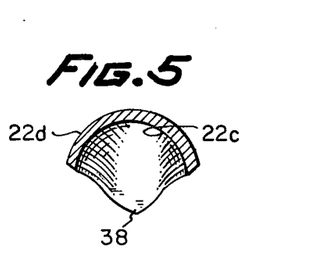
FIG. 5 is a further enlarged sectional view of one of the teeth taken along the line 5—5 of FIG. 2.
Figure 8:
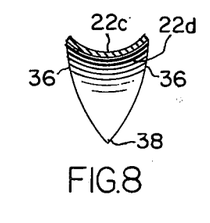
FIG. 8 is an enlarged, sectional end view of a tooth, taken along the line 8—8 of FIG. 7.

The hub 21 includes a hollow cylindrical sidewall 32 which is integral with the planar base 24 and is generally parallel to a longitudinal axis 33 of the stud 20 and perpendicular to the immediately adjacent mounting portion integral the belt 12. The teeth 22 are integral with the sidewall 32 and diverge axially and radially outwardly therefrom. The teeth 22 are concavo-convex and, as illustrated in FIGS. 5 and 8, are generally arcuate in cross-section to enhance the load bearing characteristics of the stud 20. The curvatures of the inner concave surfaces 22c and outer convex surfaces 22d extend in a circumferential direction. The circumferentially spaced tooth edges 36 are curvilinear in plan and converge to sharp, generally vertical, ice penetrating edges 38.

Figure 1:
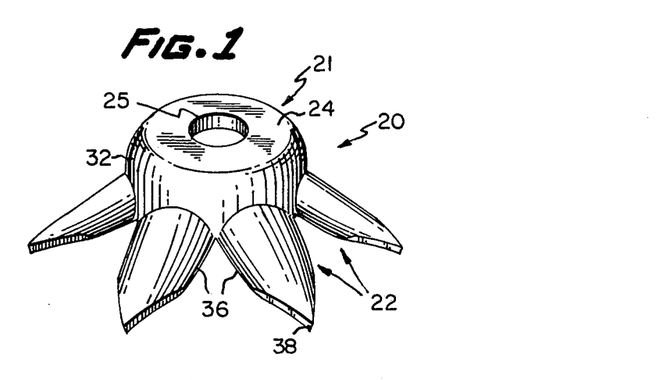
FIG. 1 is an enlarged perspective view of a stud constructed according to the present invention.

The teeth 22 diverge radially outwardly relative to the sidewall 32 and the axis 33 at such an angle that, as the lead tooth 22 of each stud engages the surface 40 being traversed in the position illustrated at S in chain lines in FIG. 1, the lead tooth 22 is generally vertical relative to the surface 40. This is important because as the studs 20 negotiate the front drive roll 14, the nearly vertical lead stud tooth will penetrate and dig into the ice 40, and not skip over the ice surface as is sometimes the case if the teeth 22 are in the plane of the annular wall 32 and not flared outwardly. The terminal ice penetrating edges 38 of all the teeth 22 are substantially the same distance 42 from the outer belt surface 18. After the stud 20 completely negotiates the front drive roll 14, the terminal ice penetrating tooth edges 38 all penetrate the ice. The sharp generally vertical, ice penetrating edges 38 are presented equiangularly about the axis 33 to dig into the ice 40 and inhibit sliding movement of the belt 12 relative to the surface 40 in any direction about the stud axis 33. The axial length 44 of the cylindrical sidewall 32 is substantially equal to the axial length 46 of the teeth 22.

Figure 9:
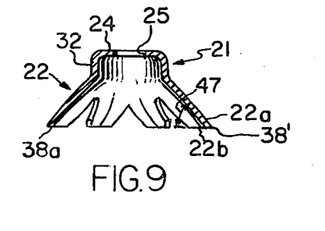
FIG. 9 is a vertical sectional view substantially identical to that of FIG. 7 but illustrating the teeth after they have been worn.
Figure 10:
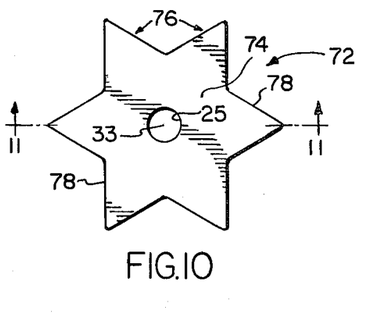
FIG. 10 is a top plan view of a blank used to make a stud.
Figure 11:
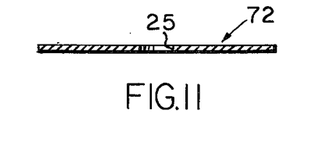
FIG. 11 is a sectional side view of the blank taken on the line 11—11 of FIG. 10.
Figures 12, 13, 14:
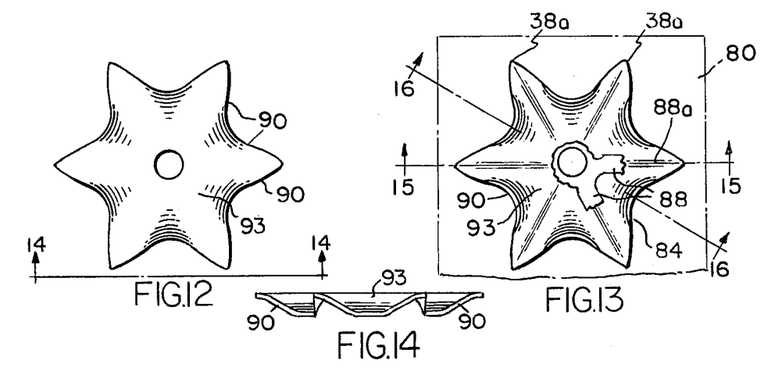
FIG. 12 is a top plan view illustrating the blank at an interim state of process of manufacture.
FIG. 13 is an underplan sectional view of the blank disposed in a mold during an interim stage of manufacture, taken along the line 13—13 of FIG. 15, the dies being illustrated in phantom.
FIG. 14 is a side elevational view of the blank during an interim stage of manufacture, taken along the line 14—14 of FIG. 12.
Figure 15:
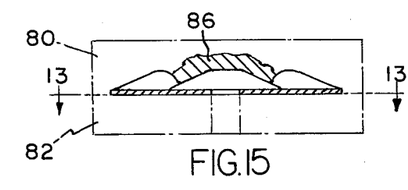
FIGS. 15 and 16 are side sectional views of the set of dies and blank at an interim stage of manufacture, taken along the lines 15—15 and 16—16 respectively.
Figure 15A:
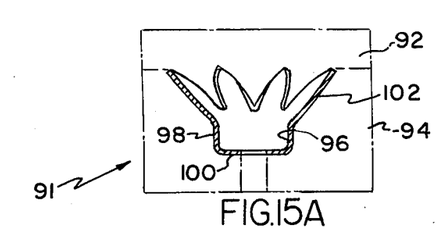
FIGS. 15A and 16A are side sectional views substantially similar to FIGS. 15 and 16 respectively but illustrating the blank in another set of dies at the final stage of manufacture.
Figure 16:
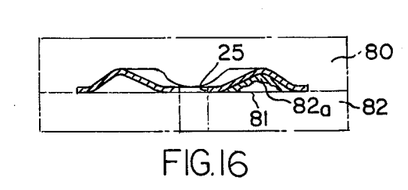
Figure 16A:
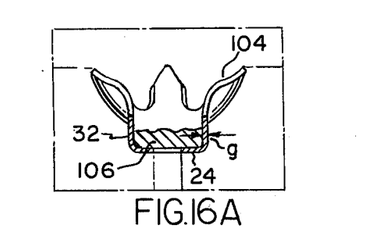

As is illustrated in FIG. 9, after the teeth 22 wear, the vertical edges 38 will become blunted, however, the outer surface 22a and the lowermost tooth surface 22b of the teeth 22 will remain at an acute angle 47 providing a sharp ice penetrating, horizontal edges 38' which will dig into the ice as the teeth wear. Accordingly, although the vertical edges 38 will be blunted, the sharp horizontal edges 38' will be maintained throughout the wearing of the teeth and thus the teeth are substantially self-sharpening. This feature is particularly important to racers who must maintain maximum traction throughout the race. The stud 20 has six equiangularly spaced teeth 22. The studs 20 may be mounted in a U-shaped cleat or channel 27 which is mounted on the outside surface 18 of the belt 12 and extends transversely the full width of the belt. The stud 20 may be disposed in the channel 27 as illustrated at 38A in FIGS. 17 and 19, with two laterally spaced lead teeth 38c, or rotated relative to the stud axis 33 so that the stud 20 has only one lead tooth 38f as illustrated at 38B in FIGS. 17 and 19.

Figure 18:
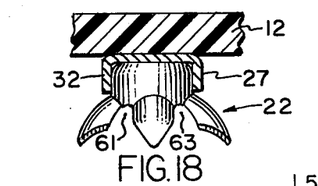
FIG. 18 is a sectional side view taken along the line 18—18 of FIG. 17.

When the stud 20 is oriented as illustrated at 38A, the ground engaging, terminal tooth edges 38 of the two laterally spaced lead teeth 38c, lie in vertical planes 50 and 51, which are parallel to the path of belt travel and intersect the terminal tooth edges 38 on the two laterally spaced teeth 38d at the trailing side of the stud axis 33. The terminal edges 38 of the remaining two teeth 38e lie in a vertical planes 52 which are parallel to the path of the belt travel 16, laterally outwardly of the planes 50 and 51. As viewed in FIG. 19 the teeth of the stud illustrated at 38A are longitudinally aligned to present unobstructed longitudinal paths 54, 55 and 56 between the planes 50, 51 and 52, which provide flow through paths through which any ice and snow may freely pass without being obstructed by another tooth. When the stud 20 is positioned as illustrated at 38A, the two lead teeth 38c, also lie in a transverse vertical plane 58 which is perpendicular to the path of travel whereas the terminal ends 38 of the two laterally spaced trailing teeth 38d lie in a transverse, vertical plane 60 which is perpendicular to the path travel. The terminal edges 38 of the two laterally outermost teeth 38e lie in a transverse, vertical plane 62 which is perpendicular to the path of travel. As viewed in FIG. 18, the teeth are laterally aligned to present unobstructed paths 61 and 63 between the teeth 38 through which ice and snow and other foreign matter can unimpededly flow in a direction transverse to the path of belt travel.

Figure 17:
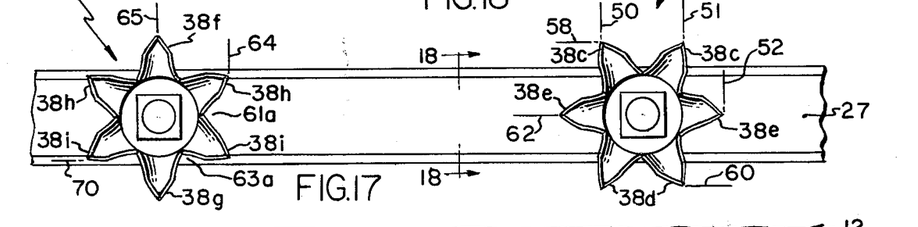
FIG. 17 is a bottom plan view illustrating a pair of studs mounted in a U-shaped mounting cleat at slightly different positions.
Figure 19:
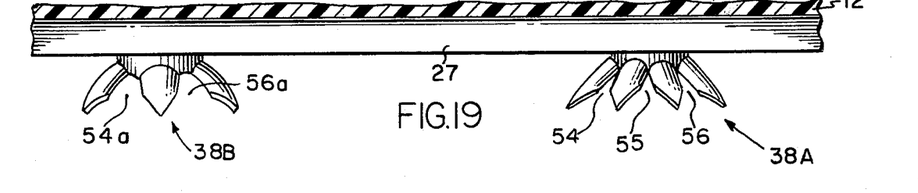
FIG. 19 is a front elevational sectional view of one run of the snowmobile drive belt and cleat assembly illustrated in FIG. 17.

If the stud is rotated 90° as illustrated at 38B, the terminal edge 38 of the lead tooth 38f lies in a vertical plane 62 which is parallel to the path of travel and intersects the terminal edge 38 of the trailing tooth 38g. The remaining two teeth 38h on the lead side of the axis 33 have terminal edges 38 lying in vertical planes 64 which are parallel to the path of belt travel and intersect the terminal edges 38 of the two remaining teeth 38*i* on the trailing side of the axis 33. The terminal edges 38 of the teeth 38*h* and 38*i* lie in a transverse vertical plane 70. The teeth of the stud illustrated at 38B are also longitudinally and laterally aligned to provide unobstructed longitudinal paths 54*a* and 56*a* and transverse paths 61*a* and 63*a* between the stud teeth, permitting substantially unobstructed passage of ice therethrough. The unobstructed passage of ice in the lateral and longitudinal paths between the teeth 22 inhibits the formation of ice on the inside of the stud. If ice were to form on the inside of the stud, the stud would lose much of its traction capabilities.

METHOD OF MAKING

Referring now more particularly to FIGS. 10–16, 15A and 16A, the stud 20 is made by initially cutting a star-shaped blank 72 (FIG. 10) from a sheet of mild steel or high alloy tool steel. The blank 72 is cut with a central hub portion 74 having a plurality of radially outwardly projecting lobes 76 circumferentially disposed about the axis 33. The central mounting aperture 25 is then pierced or cut into the hub portion 74. As viewed in FIG. 10, the lobes 76 are cut with generally linear side edge portions 78. The blank 72 is then placed between complementally shaped male and female forming dies, schematically illustrated at 80 and 82 respectively. The female die 82 includes a die cavity 81 having a plurality of circumferentially spaced radially outwardly projecting circumferentially spaced curvilinear recesses 84 which receive the lobes 76 when the male die 80 is moved toward the female cavity 81. The male die 80 includes a central punch, schematically designated 86, mounting a plurality of radially outwardly circumferentially spaced, projecting die wings, schematically designated 88, which lie in radial vertical planes 88*a* intersecting the axis 33 and the terminal edges 38*a* of the lobes 76. The die wings 88 are axially aligned with the female die recesses 84. The lower die surface of the die wings 88 are convex and the upper die surface of the die cavity recesses 84 are complementally concave. As the male and female dies close and force the blank 72 into the female cavity 81, the circumferentially spaced sides 90 of the lobes 76 bend toward each other out of the plane of the blank to partially bend and stretch the lobes 76 to the partially concavoconvex shapes illustrated in FIGS. 12 – 14. At this same time, the hub portions 93 at the roots of the lobes 76 are stretched axially in the same direction by protruding female die portions, schematically designated 82*a*. This formation step is very important to properly curve the teeth 22 and insure proper load bearing capabilities of the stud.

Figures 2, 4:
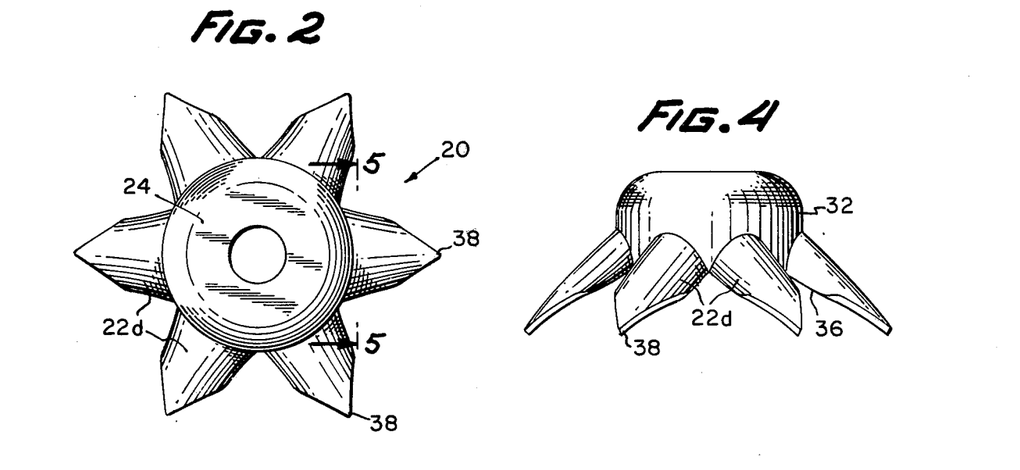
FIG. 2 is a top plan view of the stud illustrated in FIG. 1.
FIG. 4 is a side elevational view of the stud.
Figure 3:
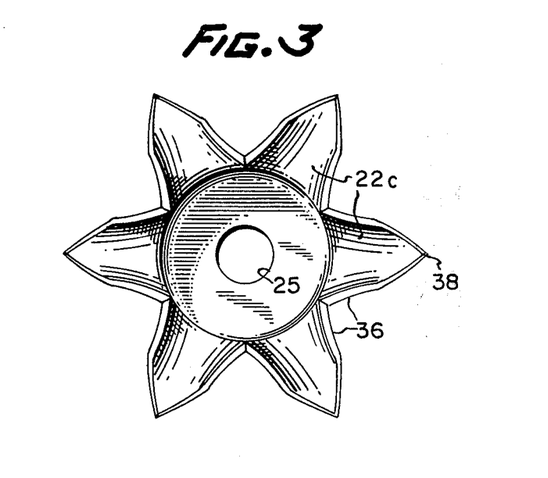
FIG. 3 is an underplan view of the stud illustrated in FIGS. 1 and 2.

The partially formed blank is then removed from the dies 80 and 82 and placed into a second die set schematically illustrated at 91 having a female die 92 and a complementary male die. The female die 92 includes a relatively deep, circular cavity 96 having an annular sidewall 98 and a flat bottom wall 100. The female die 90 includes circumferentially spaced, radially outwardly flaring die cavity projections schematically illustrated at 102 having a concave shape complementary to the final convex shape of the outer tooth surfaces 22*d*, as illustrated in FIG. 2.

The male die 94 includes a plurality of radially outwardly flaring wings 104 which are aligned with the female die cavity projections 102. The wings 104 are convex and complementary to the concave surfaces 22*c* on inside of the final form of concavo-convex teeth 22 as illustrated in FIG. 2. The male die includes a central, axially projecting circular punch 106 which, when fully inserted into the die cavity 96, is spaced from the wall 92 by a punch enccompassing gap *g*. The punch 106 presses the blank hub 74 downwardly into the cavity 96 and stretches the material 94 to the hollow, cylindrical hub shape illustrated in FIG. 4 to provide the cylindrical sidewall 32 and the flat planer base 24. The projection 102 and male die tooth pressing members 104 are inclined to bend the terminal ends of the lobes 76 axially outwardly away from the hub to positions inclined approximately 35° to the sidewall 32 and axis 33. In the final stretching step the hub portion 93 which was initially deformed axially upwardly out of the plane of the blank is bent and stretched in an axially opposite downward direction to the opposite side of the plane to form a portion of the hub sidewall 32. The radius of curvature of the die wings 104 and the die cavity projections 102 is greater than the radius of curvature of the die wings 88 and the die cavity recesses 84 so that the side portions 90 of the lobes 76 are further bent toward each other out of the plane of the blank to form the circumferentially arcuate teeth 22. It is important and necessary that the steps of bending the blank 72 to initially form the arcuate teeth and to form the hub 21 be performed sequentially.

Figure 7:
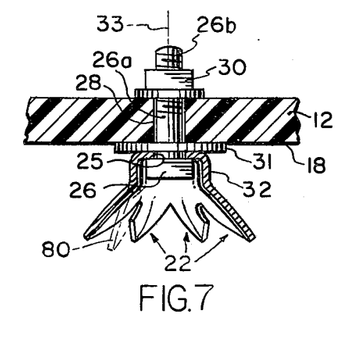
FIG. 7 is an enlarged, vertical sectional, side view taken along the line 7—7 of FIG. 6.

The stud 20 is then heat treated to a Rockwell C Scale hardness in the range of 45–60. The overall stud height 42 is generally substantially equal to the maximum racing height permitted. If the teeth 22 are not hardened, it is possible that they would bend radially inwardly a substantial distance to a position schematically illustrated at 80 in FIG. 7. This would increase the overall height of the stud and possibly disqualify a racer. When the teeth are hardened as described, they will break off before bending a sufficient distance to disqualify a racer.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A one piece stud for an endless snowmobile drive track or the like comprising:
    a central mounting hub having a cylindrical sidewall parallel to the longitudinal axis of said stud;
    a plurality of perimetrically disposed radially outwardly flaring ground engaging projections diverging radially outwardly from said sidewall and in a direction axially away from said hub.

2. A method of making a ground engaging stud for a snowmobile track or the like comprising:
    providing a metal blank having a central hub and a plurality of perimetrically spaced, radially outwardly projecting lobes;
    stretching portions of said blank at the junctions of said lobes and said hub to at least partially bend the perimetrical sides of said lobes and provide curvilinear teeth; and
    stretching the hub to provide a cup shaped mounting body having a longitudinal axis and bending the teeth to radially outwardly flaring positions inclined to said axis.

3. The method as set forth in claim 2 wherein said last mentioned stretching step includes bending the perimetrical sides further in a direction towards each other to increase the curvature of said teeth.

4. The method as set forth in claim 2, wherein said first mentioned stretching step includes stretching said portions in a first direction transverse to the plane of said blank and said second mentioned stretching step includes stretching at least a part of said portions in an opposite direction to form a part of said hub.

5. A method of making a one piece stud with a blank having a central hub and a plurality of radially outwardly projecting lobes comprising the steps of:
   bending portions of said blank, including at least parts of said lobes in a first direction to provide concavo-convex ground engaging teeth, and then
   bending a fraction of said portions in an opposite direction to provide a hub suitable for mounting on a snowmobile track.

6. Traction increasing apparatus for an endless snowmobile drive belt including:
   a channel shaped cleat adapted to be mounted on the outer surface of said belt generally transversely to the path of travel of said belt; and
   a stud having a hub received in said channel and a plurality of equiangularly spaced, outwardly diverging ground engaging teeth projecting outwardly from said hub;
   said stud and said teeth being arranged such that the terminal ends of at least two of said teeth on the lead side of said axis lie in vertical planes which are parallel to the path of travel and intersect the terminal ends of at least two opposing teeth on the opposite trailing side of said axis;
   said stud and said teeth being so arranged that the terminal ends of at least two of said teeth on one lateral side of the stud axis lie in vertical planes which are perpendicular to the path of travel and intersect the terminal ends of at least two opposing teeth on the laterally opposite side of said stud axis.

7. A method of making a ground engaging stud for a snowmobile track comprising the steps of:
   forming a blank having a central hub and a plurality of perimetrically disposed lobes projecting radially outwardly therefrom;
   bending perimetrically opposite side portions of the lobes in a direction transverse to the plane of said blank toward each other to provide a plurality of curvilinear teeth; and
   bending the central hub in an opposite direction to provide a cup-shaped mounting hub.

8. The method as set forth in claim 7 wherein the step of bending the central hub includes forming an annular sidewall extending perimetrically about a longitudinal axis of said stud immediately adjacent said teeth, and further including the step of bending the teeth relative to the hub to move the outer ends of said teeth axially away from said hub to positions inclined to the axis of said stud.

9. The method as set forth in claim 8 wherein the terminal edges of said teeth are substantially equidistant from said hub and equidistantly from said axis.

10. The method as set forth in claim 7 wherein the blank comprises metal material; the hub is formed with a central mounting aperture and the lobes are initially formed with linear sides converging to sharp edges; said step of bending the lobes includes bending the linear sides axially about radii intersecting the longitudinal central axis of said stud and said sharp edges.

11. The method as set forth in claim 10 wherein said blank comprises metal material; said first mentioned bending step includes stretching portions of said blank at the juncture of said hub and said teeth and bending said teeth to concavo-convex shape with curvilinear edges; said step of bending said hub includes stretching said metal material of said hub.

12. A one piece stud for an endless snowmobile drive track movable in an endless path to forwardly propel a snowmobile or the like comprising:
   hub means for mounting the stud to the track including a sidewall extending perimetrically about a longitudinal axis of said stud, said hub means including leading and trailing sides; and
   a plurality of perimetrically symmetrically disposed ground engaging projections on each of the opposed leading and trailing sides of said hub means diverging radially outwardly from said sidewall in a direction axially away from said hub means, said projections including ground engaging edge portions;
   said hub means including means for mounting said projections on said track such that said ground engaging edge portions are substantially equidistantly spaced from said track.

13. The stud as set forth in claim 12 wherein said projections are equiangularly spaced about said axis.

14. The stud as set forth in claim 12 wherein said leading and trailing sides are on opposite sides of a plane intersecting said axis, said projections on each of said leading and trailing sides are equiangularly spaced about said axis.

15. The stud as set forth in claim 14 wherein said projections on each side of a plane, perpendicular to said first mentioned plane and intersecting said axis are equiangularly spaced.

16. The hub as set forth in claim 12 wherein the projections on the leading and trailing sides of said hub means are on opposite sides of a plane intersecting said axis; the projections on each of said leading and trailing sides being symmetrical relative to a second plane perpendicular to said first mentioned plane and intersecting said axis.

17. The hub as set forth in claim 12 wherein said sidewall is hollow and parallel to said axis and the projections on each lateral side of said hub means are symmetrically disposed.

18. The stud as set forth in claim 12 wherein said projections comprise a plurality of lobes which are concavoconvex along at least a substantial portion of their length, the curvature of lobes being perimetrical.

19. The stud as set forth in claim 12 wherein said projections have perimetrically opposed side edge portions which converge to radially outer terminal edges.

20. The stud as set forth in claim 12 wherein said hub means comprises a generally planer, generally circular base having a centrally located bolt receiving opening extending axially therethrough and a circumferential edge portion sidewall being annular and integrally joined to the circumferential edge portion of said base.

21. The stud as set forth in claim 12 wherein the axial length of said sidewall is substantially equal to the axial length of said projections.

22. The stud as set forth in claim 12 wherein said projections comprise an even number of equiangularly spaced lobes having perimetrically spaced side edge portions which converge radially outwardly to generally vertical sharp ground engaging edges.

23. The studs as set forth in claim 12 wherein said projections comprise a plurality of ground engaging teeth having inner and outer surfaces which have concavo and convex curvatures respectively, extending in a perimetrical direction.

24. A one piece stud for an endless snowmobile drive track or the like comprising:
hub means for mounting the stud to the track including a sidewall extending perimetrically about a longitudinal axis of said stud; and
a plurality of perimetrically disposed, ground engaging projections diverging radially outwardly from said sidewall in a direction axially away from said hub means, said projections including ground engaging edge portions;
said hub means including means for mounting said projections on said track such that said ground engaging edge portions are substantially equidistantly spaced from said track;
said projections being equiangularly disposed about said axis.

25. The stud as set forth in claim 24 wherein said sidewall is parallel to said axis.

26. A method of making a one piece stud for a snowmobile track or the like comprising:
forming a star shaped blank having a central body and a plurality of circumferentially disposed segmental lobes projecting radially therefrom on opposite sides of said central body, the lobes on each side of said body being symmetrically disposed;
bending the opposite edges of the lobes out of the plane of the blank to provide arcuate lugs; and
cupping the body of the blank to provide a cup shaped mid-section having an annular sidewall and bending the lobes to positions in which said lobes flare radially outwardly in a direction axially away from said sidewall.

27. The method set forth in claim 26 wherein said bending step includes bending a portion of said body in a first direction transverse to the plane of said blank; said cupping step includes bending at least part of said portion transversely to said plane in an opposite direction.

28. A method of making a one piece stud for a snowmobile track or the like comprising:
forming a star shaped blank having a central body and a plurality of circumferentially disposed segmental lobes projecting radially therefrom;
bending the opposite edges of the lobes out of the plane of the blank to provide arcuate lugs; and
cupping the body of the blank to provide a cup-shaped mid-section having an annular sidewall and bending the lobes to positions in which said lobes flare radially outwardly relative to said sidewall in a direction axially away from said sidewall.

29. A one piece stud for an endless snowmobile drive track or the like comprising:
hub means for mounting the stud to the track including a sidewall extending perimetrically about a longitudinal axis of said stud;
a plurality of perimetrically, symmetrically disposed, radially, outwardly flaring, ground engaging projections on each of the opposed leading and trailing sides of said hub means, said projections extending axially from said sidewall in a direction away from said hub means;
said projections having opposed edge portions which perimetrically converge to radially outer terminal edges.

30. The stud set forth in claim 29 wherein said sidewall is parallel to said axis.

31. A stud as set forth in claim 12 wherein said edge portions are generally parallel to the axis of said stud.

32. The stud as set forth in claim 12 wherein said projections include concavoconvex portions arcuate in cross section.

33. The stud as set forth in claim 32 wherein each of said concavo-convex portions comprises heat treated steel material.

34. In combination:
an endless snowmobile drive track movable in an endless path for propelling a snowmobile forwardly;
at least one stud mounted on said track including a central hub for mounting the stud on the drive track; and
said central hub including a perimetrical sidewall extending parallel to a longitudinal axis of said stud, said axis being perpendicular to said track, and
a plurality of perimetrically disposed, ground engaging teeth on each of the leading and trailing sides of said hub, said teeth being integral with and projecting from said sidewall in a direction away from said track; said teeth diverging outwardly away from the sidewall in a direction away from said track and terminating in sharp edges which are substantially equidistantly spaced from said track.

35. The combination as set forth in claim 34 wherein a portion of said teeth are inclined outwardly away from said track forwardly in the direction of the travel of said track.

36. The combination as set forth in claim 35 wherein a plurality of studs are mounted on said track.

* * * * *

UNITED STATES PATENT OFFICE
CERTIFICATE OF CORRECTION

Patent No. 3,973,808　　　　　　　　　Dated August 10, 1976

Inventor(s) ROGER G. JANSSEN and WAYNE G. SCHANTZEN

It is certified that error appears in the above-identified patent and that said Letters Patent are hereby corrected as shown below:

In claim 6, lines 12, 15, 18, and 21, delete "axis" and insert -- hub --.

Signed and Sealed this

Twenty-ninth Day of August 1978

[SEAL]

Attest:

RUTH C. MASON
Attesting Officer

DONALD W. BANNER
Commissioner of Patents and Trademarks

Disclaimer

3,973,808.—*Roger G. Janssen*, Crookston; and *Wayne G. Schantzen*, Thief River Falls, Minn. ICE STUD FOR SNOWMOBIL TRACKS. Patent dated Aug. 10, 1976. Disclaimer filed Apr. 3, 1981, by the assignee, *James R. Musselman.*

Hereby enters this disclaimer to claims 1-36 of said patent.
[*Official Gazette June 9, 1981.*]